US010190848B2

(12) United States Patent
VanBecelaere

(10) Patent No.: US 10,190,848 B2
(45) Date of Patent: Jan. 29, 2019

(54) ADJUSTABLE ZERO-STOP TURRET

(71) Applicant: Vista Outdoor Operations LLC, Farmington, UT (US)

(72) Inventor: Jacob C. VanBecelaere, Gardner, KS (US)

(73) Assignee: Vista Outdoor Operations LLC, Farmington, UT (US)

(*) Notice: Subject to any disclaimer, the term of this patent is extended or adjusted under 35 U.S.C. 154(b) by 0 days.

(21) Appl. No.: 15/593,451

(22) Filed: May 12, 2017

(65) Prior Publication Data

US 2017/0328674 A1     Nov. 16, 2017

Related U.S. Application Data

(60) Provisional application No. 62/336,185, filed on May 13, 2016.

(51) Int. Cl.
*F41G 1/38*        (2006.01)
*G02B 23/14*     (2006.01)
(Continued)

(52) U.S. Cl.
CPC .............. *F41G 1/38* (2013.01); *G02B 7/004* (2013.01); *G02B 23/14* (2013.01); *G02B 27/36* (2013.01); *G02B 23/105* (2013.01)

(58) Field of Classification Search
CPC ..... F41G 1/16; F41G 1/18; F41G 1/28; F41G 1/38; F41G 1/387; F41G 1/473;
(Continued)

(56) References Cited

U.S. PATENT DOCUMENTS 2,583,042 A *   1/1952   Dayton ..................... F41G 1/38
                                                                                     42/122
3,280,463 A      10/1966   Stadler
(Continued)

FOREIGN PATENT DOCUMENTS

DE         202006003770 U1      6/2006
GB             2489783 A *   10/2012               F41G 1/38
(Continued)

OTHER PUBLICATIONS

International Search Report for Application No. PCT/US2017/32327, dated Dec. 26, 2017 (4 pages).

*Primary Examiner* — Stephen Johnson
*Assistant Examiner* — Benjamin S Gomberg
(74) *Attorney, Agent, or Firm* — Christensen, Fonder, Dardi & Herbert PLLC

(57) ABSTRACT

An adjustable zero-stop turret assembly for an optical firearm scope, the turret assembly defining an axis and including: a turret housing with a cavity to receive a head portion of a main turret screw and including a wall portion defining an opening; a rotatable zero-stop element carrier including a base portion, an upper portion and a first zero-stop element coupled to the base portion; an adjustable set screw adjacent the opening; a second zero-stop element receiving the screw, a first portion of the second zero-stop element positioned within the opening, and a second portion of the second zero-stop element projecting outside the opening and into the turret-housing cavity. The second zero-stop element travels axially along the screw from a first position to a second position. In the second position, portions of the first zero-stop element and the second zero-stop element reside in a common plane perpendicular to the axis.

18 Claims, 10 Drawing Sheets

(51) Int. Cl.
*G02B 27/36* (2006.01)
*G02B 7/00* (2006.01)
*G02B 23/10* (2006.01)

(58) Field of Classification Search
CPC .......... F41G 3/08; F41G 11/00; G02B 27/36; G02B 7/00; G02B 7/02; G02B 7/023; G02B 7/004; G02B 23/16
USPC .......... 42/119–120, 122, 135–139; 359/399, 359/421–432
See application file for complete search history.

(56) References Cited

U.S. PATENT DOCUMENTS

| | | | |
|---|---|---|---|
| 3,990,155 A | 11/1976 | Akin, Jr. et al. | |
| 4,012,966 A * | 3/1977 | Lieberman | G05G 1/10 192/12 R |
| 4,247,161 A | 1/1981 | Unertl, Jr. | |
| 4,297,801 A | 11/1981 | Kahn | |
| 4,389,791 A | 6/1983 | Ackerman | |
| 4,392,723 A | 7/1983 | Gehmann | |
| 4,643,542 A * | 2/1987 | Gibson | F41G 1/38 359/424 |
| 5,329,829 A | 7/1994 | Sell | |
| 5,557,871 A | 9/1996 | LaLonde | |
| 5,715,607 A | 2/1998 | Murg | |
| 5,906,141 A | 5/1999 | Abdelmoula | |
| 6,279,259 B1 | 8/2001 | Otteman | |
| 6,351,907 B1 * | 3/2002 | Otteman | F41G 1/38 42/120 |
| 6,643,970 B2 | 11/2003 | Huber | |
| 6,691,447 B1 * | 2/2004 | Otteman | F41G 1/38 359/429 |
| 6,721,095 B2 * | 4/2004 | Huber | G02B 27/34 359/425 |
| 6,772,550 B1 | 8/2004 | Leatherwood | |
| 7,581,346 B2 | 9/2009 | Klepp et al. | |
| 7,612,952 B2 * | 11/2009 | Schafer | F41G 1/18 356/247 |
| 7,624,526 B2 | 12/2009 | Paasikivi et al. | |
| 7,806,331 B2 | 10/2010 | Windauer et al. | |
| 7,827,723 B1 | 11/2010 | Zaderey et al. | |
| 7,934,335 B2 | 5/2011 | Halverson | |
| 7,997,163 B2 | 8/2011 | Casas | |
| 8,006,429 B2 | 8/2011 | Windauer | |
| 8,033,464 B2 | 10/2011 | Windauer et al. | |
| 8,166,696 B2 | 5/2012 | Hamilton | |
| 8,166,697 B1 | 5/2012 | Sueskind | |
| 8,270,104 B2 | 9/2012 | Windauer | |
| 8,286,384 B2 | 10/2012 | Zaderey et al. | |
| 8,312,667 B2 | 11/2012 | Thomas et al. | |
| 8,317,100 B2 | 11/2012 | Windauer et al. | |
| 8,397,420 B2 | 3/2013 | Hamilton | |
| 8,407,927 B2 * | 4/2013 | Huber | F41G 1/38 359/405 |
| 8,413,364 B2 | 4/2013 | Riley | |
| 8,479,402 B2 | 7/2013 | Schmitt | |
| 8,490,317 B2 | 7/2013 | Adkins et al. | |
| 8,516,736 B2 | 8/2013 | Windauer | |
| 8,875,435 B2 | 11/2014 | Menges et al. | |
| 8,919,026 B2 | 12/2014 | Hamilton | |
| 8,928,878 B2 * | 1/2015 | Jaeschke | G02B 27/36 33/298 |
| 8,984,796 B2 | 3/2015 | Thomas et al. | |
| 9,062,934 B1 | 6/2015 | Presley et al. | |
| 9,188,408 B2 * | 11/2015 | Huynh | F41G 1/22 |
| 9,297,615 B2 | 3/2016 | Meinert et al. | |
| 9,354,438 B2 * | 5/2016 | Ingenito | F41G 1/38 |
| 9,970,735 B2 * | 5/2018 | Walker | F41G 1/38 |
| 9,989,362 B2 * | 6/2018 | Ottl | F41G 1/38 |
| 10,054,398 B2 * | 8/2018 | White | F41G 1/18 |
| 10,054,399 B2 * | 8/2018 | VanBecelaere | G02B 7/004 |
| 2003/0140545 A1 | 7/2003 | Huber | |
| 2004/0144013 A1 | 7/2004 | Leatherwood | |
| 2011/0261449 A1 | 10/2011 | Schmitt | |
| 2012/0147488 A1 | 6/2012 | Riley | |
| 2012/0167444 A1 | 7/2012 | Adkins et al. | |
| 2013/0276345 A1 | 10/2013 | Hamilton | |
| 2014/0000146 A1 | 1/2014 | Davidson | |
| 2015/0068099 A1 | 3/2015 | Hamilton | |
| 2015/0070758 A1 | 3/2015 | Ingenito | |
| 2015/0153138 A1 | 6/2015 | Presley et al. | |
| 2015/0316350 A1 * | 11/2015 | Hamilton | F41G 1/38 42/122 |
| 2015/0323778 A1 * | 11/2015 | Takahashi | G02B 23/145 359/422 |
| 2016/0040959 A1 | 2/2016 | Davidson et al. | |
| 2016/0178323 A1 * | 6/2016 | Ottl | F41G 3/32 74/532 |
| 2017/0205195 A1 * | 7/2017 | Sheets, Jr. | F41G 1/38 |
| 2017/0254620 A1 * | 9/2017 | Dasukevich | F41G 1/38 |
| 2018/0180383 A1 * | 6/2018 | Lin | F41G 1/38 |
| 2018/0209763 A1 * | 7/2018 | Cheng | G05G 5/00 |

FOREIGN PATENT DOCUMENTS

| | | |
|---|---|---|
| WO | WO2006/003265 | 1/2006 |
| WO | WO2006/017868 | 2/2006 |
| WO | WO2006/017869 | 2/2006 |
| WO | WO2014/145288 | 9/2014 |

* cited by examiner

ADJUSTABLE ZERO-STOP TURRET

CROSS-REFERENCE TO RELATED APPLICATIONS

The present application claims the benefit of U.S. Provisional Application No. 62/336,185, filed May 13, 2016, which is incorporated herein by reference in its entirety.

FIELD OF THE INVENTION

The present invention is directed generally to a turret for an optical aiming device. Specifically, the present invention is directed to a turret for an optical aiming device, such as a riflescope, having a conveniently adjustable zero-stop mechanism with an optional locking feature.

BACKGROUND

Many firearms, such as rifles, are equipped with an optical aiming device, such as a rifle scope, that provides the user with an image of an aligned aiming point or pattern (commonly known as a reticle) superimposed at the same focus as the target.

When shooting at long distances, shooters must adjust their aim to take into account the downward acceleration on the projectile imparted by gravity, which is often referred to as "bullet drop." This is typically done by adjusting the angular position of the rifle scope relative to the rifle barrel using an elevation turret. A shooter may also adjust for left-to-right movement due to wind using a windage turret.

A zero point (also sometimes referred to as a "zero mark" or "zero location" or similar) for a rifle scope is determined when "sighting" a rifle, or other firearm, at a known distance by adjusting the angular position of the riflescope relative to the rifle barrel, via the elevation turret, until the impact point of the bullet matches the point on the target coincident with the optical center of the riflescope reticle. The zero point of the riflescope is set such that the rifle is sighted in at a first known distance, sometimes referred to as the "zero distance" or in some cases, the "zero-stop distance." This known distance is typically the shortest distance for which the rifle is sighted. For targets at greater distances than the zero distance, the elevation turret is rotated to adjust the angular position of the scope with respect to the rifle barrel to compensate for the greater amount of bullet drop over the longer distance. For example, a zero-point of a turret may be set to correspond to a zero distance of 100 yards. For distances greater than the zero distance of 100 yards, a user rotates or "dials" the elevation turret a predetermined amount, often measured in minutes of angle (MOA) or mils, such that the riflescope is sighted in for the greater distance. For example, in a typical riflescope turret having sighting indicia, the indicium/number "0" may correspond to the zero-point distance of 100 yards; the number 3, or 3 MOA may correspond to 200 yards, and so on. When the "0" indicium on the turret is aligned with an alignment mark ("zero mark") on the riflescope body, the rifle scope is sighted in ("zeroed in") at the zero distance, e.g., 100 yards, such that a bullet should accurately strike a target located 100 yards from the user.

Known rifle scopes having adjustable turrets may also incorporate a "zero-stop" mechanism that serves to limit the rotation of the turret, and provides a mechanical indication of the zero point. For example, a turret having a zero-stop mechanism may limit rotation of the turret in one direction or another. Once a riflescope has been properly sighted, the zero point determined, and a zero-stop mechanism adjusted, the particular rotational position of the turret at which the turret is prevented from rotating will correspond to the zero point.

SUMMARY

Although many known rifle scopes may include turrets with some sort of zero-stop system or mechanism, the zero-stop mechanisms of known turrets are often difficult for a user to initially adjust, and often require significant disassembly of the turret in the field while sighting in the firearm. In some cases, the process of setting the zero-stop mechanism may be complicated for a user, may require multiple tools, and may result in turret or scope parts being misplaced or lost. This can be especially frustrating for a user that regularly changes ammunition which affects bullet ballistics and requires resetting of a zero-stop mechanism on a somewhat regular basis, or for a user that moves the riflescope from one firearm to another.

Consequently, it is an object of the invention to provide a rifle scope and a turret having a zero-stop mechanism that can be easily set and re-set by a user. In some embodiments, the turret may include an easy-to-use locking feature that prevents rotation of the turret while in the locked position after setting the zero point, giving the user confidence that their turret has not been adjusted or accidentally moved prior to firing a shot.

Accordingly, an embodiment of the invention includes a locking turret for an optical firearm scope, the turret defining a central vertical axis and comprising: a main screw rotatable about the central vertical axis; a turret cover configured to be grasped by a user, the turret cover including a locking ring; a turret housing including a locking-ring receiving portion configured to receive and engage the locking ring of the turret cover in a first, locked position, such that rotational movement of the turret cover is limited; a linking structure comprising a base portion coupled to the main screw and an upper portion coupled to the turret cover, the upper portion being coupled to the base portion so as to allow limited axial travel of the upper portion relative the base portion and the main screw, and thereby limit axial travel of the turret cover and prevent disengagement of the turret cover from the turret housing.

Another embodiment comprises an optical firearm scope with a locking turret, comprising: a scope body; and a locking turret coupled to the scope body, the locking turret defining a central vertical axis and including: a main screw rotatable about the central vertical axis and having a shaft portion extending into an interior of the scope body; a turret cover configured to be grasped by a user, the turret cover including a locking ring; a turret housing including a locking-ring receiving portion configured to receive and engage the locking ring of the turret cover in a first, locked position, such that rotational movement of the turret cover is limited; a linking structure comprising a base portion coupled to the main screw and an upper portion coupled to the turret cover, the upper portion being coupled to the base portion so as to allow limited axial travel of the upper portion relative the base portion and the main screw, and thereby limit axial travel of the turret cover and prevent disengagement of the turret cover from the turret housing.

Another embodiment comprises an adjustable zero-stop turret assembly for an optical firearm scope, the turret assembly defining a central vertical axis and comprising: a turret housing defining a turret housing cavity configured to receive a head portion of a main screw, the turret housing including a wall portion, the wall portion defining an opening; a zero-stop element carrier configured to rotate about the central vertical axis and including a base portion, an upper portion and a first zero-stop element, the first zero-stop element coupled to the base portion; an adjustable set screw adjacent the opening of the wall portion, the adjustable set screw including a threaded shaft portion; a second zero-stop element receiving the threaded shaft portion, a first portion of the second zero-stop element positioned within the opening of the wall portion, and a second portion of the second zero-stop element projecting outside the opening of the wall portion and into the turret housing cavity; and wherein the second zero-stop element is configured to travel axially along the shaft of the adjustable set screw from a first axial position to a second axial position, and wherein in the second axial position, portions of the first zero-stop element and the second zero-stop element reside in a common plane, the common plane being perpendicular to the central axis.

Another embodiment comprises a method of operating a rifle scope having a scope body and an adjustable locking turret that includes a main screw and a turret housing engaging a turret cover with a locking ring, including the steps of: applying an axial force to the turret cover causing the turret cover to move away from the body of the scope; maintaining a mechanical connection of the turret cover to the main screw during application of the axial force to the turret cover via a linking structure having a stationary portion and a moving portion; causing the moving portion of the linking structure to move axially and away from the stationary portion until the moving portion contacts a travel-limiting structure, thereby limiting axial movement of the turret cover and causing a locking ring of the turret cover to disengage from the turret housing; and applying a rotational force to the turret cover, thereby rotating the main screw.

Another embodiment comprises a method of setting a zero-stop of a firearm scope turret assembly having a main screw, a turret housing, a rotatable zero-stop-element carrier coupled to a first stop element, a second stop element, and an adjustable set screw, the method comprising the steps of: rotating a release screw linking the rotatable zero-stop to the main screw to allow separation of the rotatable zero-stop-element carrier from the main screw; lifting a top portion of the rotatable zero-stop-element carrier, causing the top portion to slide axially along a base portion of the rotatable zero-stop-element while the base portion remains engaged with the main screw; further lifting the top portion of the rotatable zero-stop-element carrier, causing the top portion to contact a travel-limiting structure of the rotatable zero-stop-element carrier and causing the bottom portion of the rotatable zero-stop-element carrier to disengage from the main screw; and rotating the zero-stop-element carrier to cause the first stop element to be adjacent the second stop element.

BRIEF DESCRIPTION OF THE DRAWINGS

The invention can be completely understood inconsideration of the following detailed description of various embodiments of the invention in connection with the accompanying drawings, in which.

Figure 1:
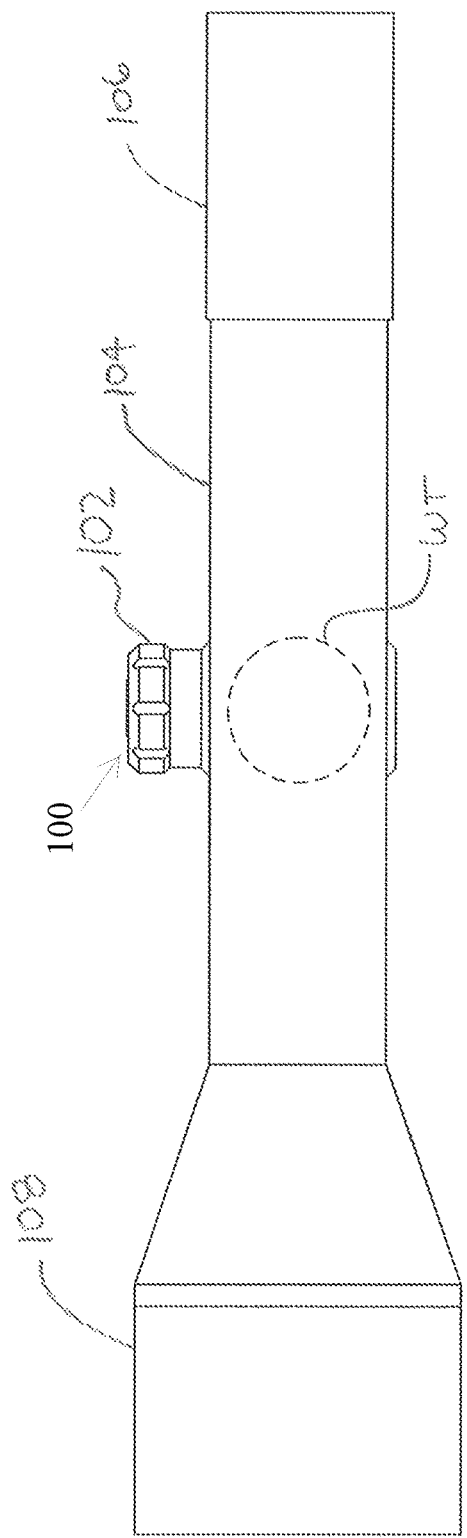
FIG. 1 is a front elevation view of an embodiment of a firearm aiming device that includes an embodiment of a locking turret assembly with an adjustable zero-stop mechanism.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments of the claimed invention described herein generally include, but are not limited to: a rotatable, lockable turret or turret assembly employing an adjustable zero-stop mechanism; a firearm aiming or sighting device, such as an optical rifle scope, carrying the turret; an adjustable zero-stop system or mechanism for a turret; and methods of operating and providing the turret, scope, and zero-stop mechanism.

Referring to FIG. 1, an embodiment of firearm aiming device 100 is depicted. In an embodiment, firearm aiming device 100 is an optical firearm scope or rifle scope, and will hereinafter be referred to as a "scope" 100 for the sake of brevity, and with the understanding that scope 100 is not limited only to an optical scope for a rifle, but may comprise other forms of firearm aiming devices that include a turret assembly. Scope 100 may be attached to, and/or used with various types of firearms, such as rifles, shotguns, handguns, bows or other types of firearms or weapons.

In an embodiment, and as will be understood by those of ordinary skill in the art, scope 100 includes turret assembly ("turret") 102, scope body 104, ocular housing 106 carrying an ocular lens system, objective housing 108 carrying an objective lens system, and an erector assembly with reticle cell (not depicted). In an embodiment, scope 100 may include additional turrets 102. In the depicted embodiment, turret 102 comprises an elevation turret. A windage turret may also be included, and positioned approximately at the dashed, circular line WT depicted as in FIG. 1, on either side of the scope body.

Turret 102 is rotatably mounted to body 104. As will be understood by those of ordinary skill, rotation of the turret causes the erector assembly with reticle cell of scope 100 to be moved relative to scope body 102, thereby enabling the aiming or sighting process. The composition and functioning of an erector assembly and lens systems of a scope are well known in the art, and will not be described in detail herein. However, such details can be found, for example, in U.S. Pat. No. 9,297,615, entitled "Multiple-Zero-Point Riflescope Turret System", issued Mar. 29, 2016, which is herein incorporated by reference in its entirety.

Figure 2:
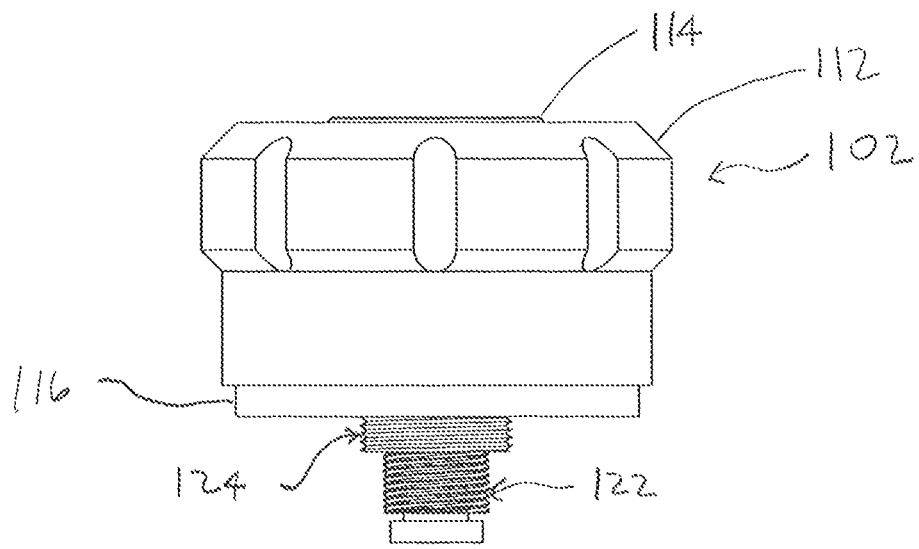
FIG. 2 is a front elevation view of the turret assembly of FIG. 2.
Figure 3:
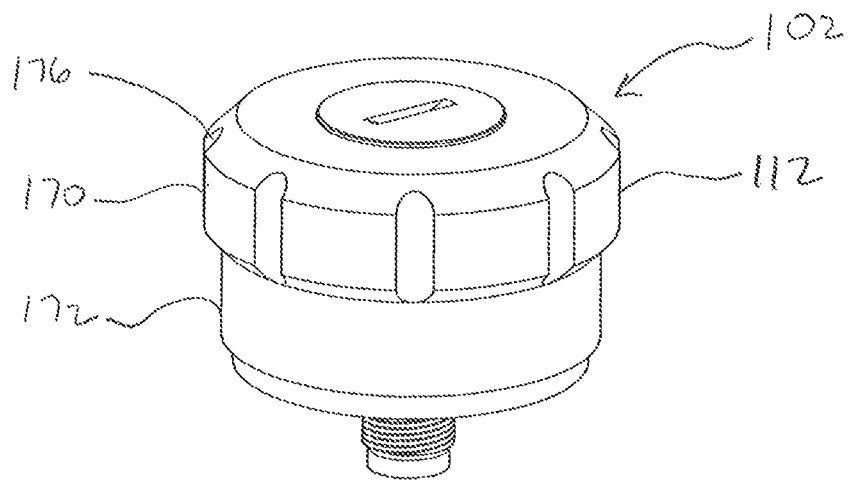
FIG. 3 is a perspective view of the turret assembly of FIG. 2.
Figure 6:
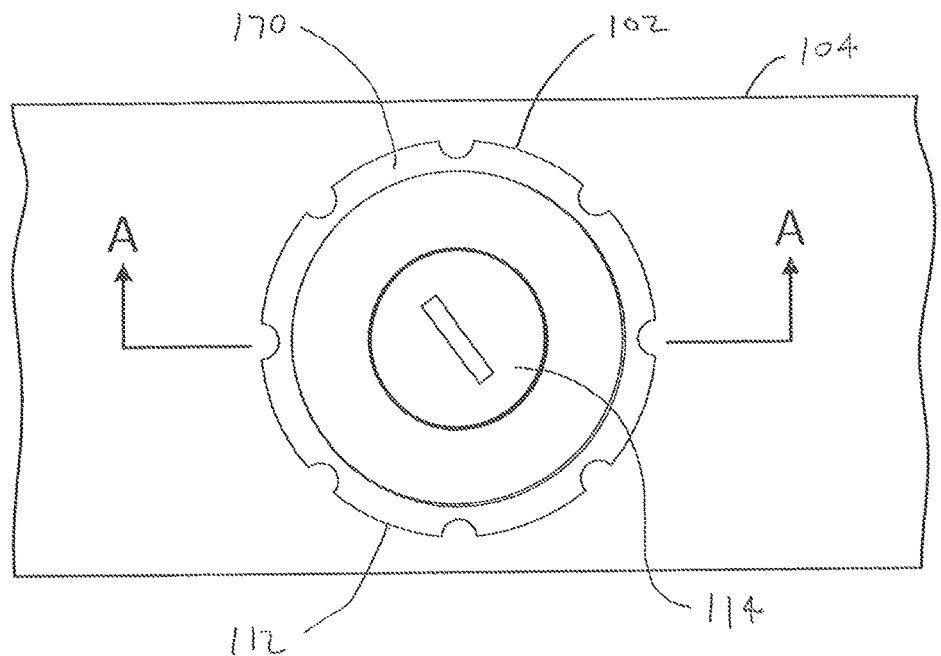
FIG. 6 is a plan view of the turret assembly of FIG. 2 assembled to a body of the firearm aiming device of FIG. 1.

Referring to FIGS. 2, 3 and 6, an embodiment of an assembled turret 102, which may also be referred to as a turret system or turret assembly, is depicted. More specifically, FIG. 2 provides a front view of turret 102, while FIG. 3 provides a front perspective view of turret 102.

Figure 4:
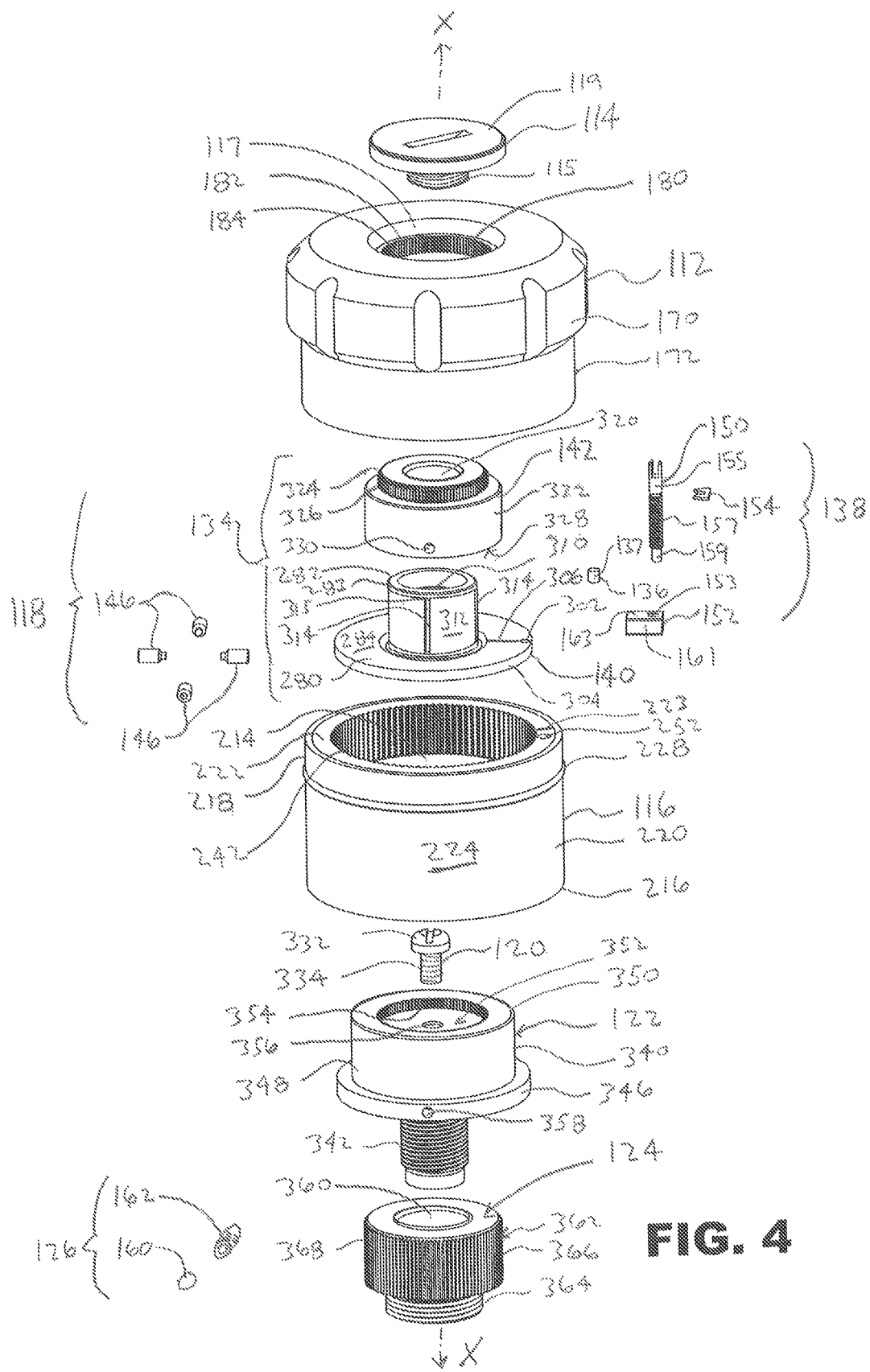
FIG. 4 is an exploded view of the turret assembly of FIG. 2.

Referring also to FIG. 4, an exploded view of turret 102 distributed about rotational, central Axis X, is depicted. In the embodiment depicted, turret 102 includes turret cover 112, turret-cover screw 114, turret housing 116, zero-stop system 118, carrier-release element 120, carrier-release-element limiting clip 121 (see, FIGS. 8-10), main screw 122, base screw 124, and audible position indicator ("clicker") system 126.

In an embodiment, zero-stop system 118 includes zero-stop-element carrier 134 ("carrier" 134), first stop element 136 and adjustable zero-stop set system 138. In an embodiment, carrier 134 includes base portion 140 and upper portion 142, secured to base portion 140, with a plurality of slide fasteners or pins 146. Zero-stop-set system 138, in an embodiment, includes adjustable set screw 150, second stop element 152, and in some embodiments, set screw retainer 154.

Clicker system 126, in an embodiment, includes ball 160 and ball retainer 162.

Figure 5:
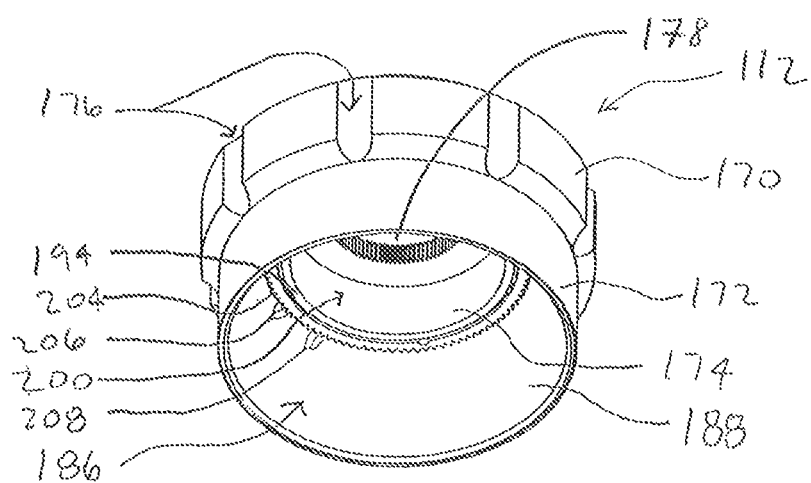
FIG. 5 is a perspective view of an embodiment of a turret cover for the turret assembly of FIG. 2.

Referring to FIGS. 4 and 5, turret cover 112 resembles a cap and comprises a generally cylindrical shape. Turret cover 112 includes upper portion 170, lower portion 172, and inner extension portion 174. Upper portion 170, as depicted, is configured to be grasped by a user of the turret, and in an embodiment, has a diameter larger than lower portion 172. In an embodiment, upper portion 170 comprises a plurality of gripping recesses 176. Lower portion 172 defines a generally-cylindrical shape, and extends downward and away from upper portion 170. Upper portion 170 defines cover aperture 178, and includes splined portion or surface 180. Cover aperture 178 is sized and configured to receive threaded shaft portion 115 of turret-cover screw 114. Upper portion 170 of turret cover 112 defines annular surface 117 configured to engage head portion 119 of turret screw 114.

Splined surface 180 includes a plurality of splines 182. Splines 182 extend axially along their lengths, and project radially into cover aperture 178 along their respective heights. It will be understood herein, that "splines" includes splines, projections, teeth, or other such projecting structure functioning to engage complementary structure as described further below. A plurality of recesses 184 are defined between pairs of adjacent splines 182 and are configured to receive complementary splines or projections of a splined portion of upper portion 142, as described further below.

In an embodiment, upper portion 170 and lower portion 172 define inside surface 188, which defines turret-housing-receiving cavity 186.

Figure 8:
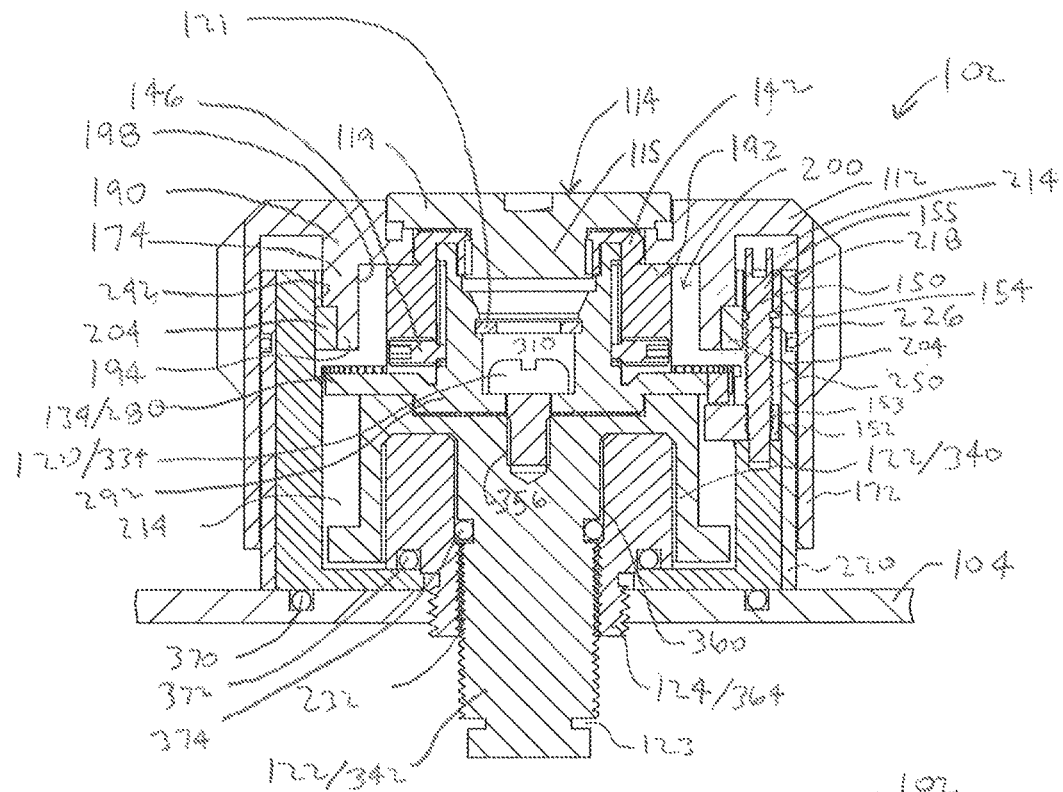
FIG. 8 is a sectional view of the turret assembly depicted in FIG. 7, in a locked position.
Figure 9:
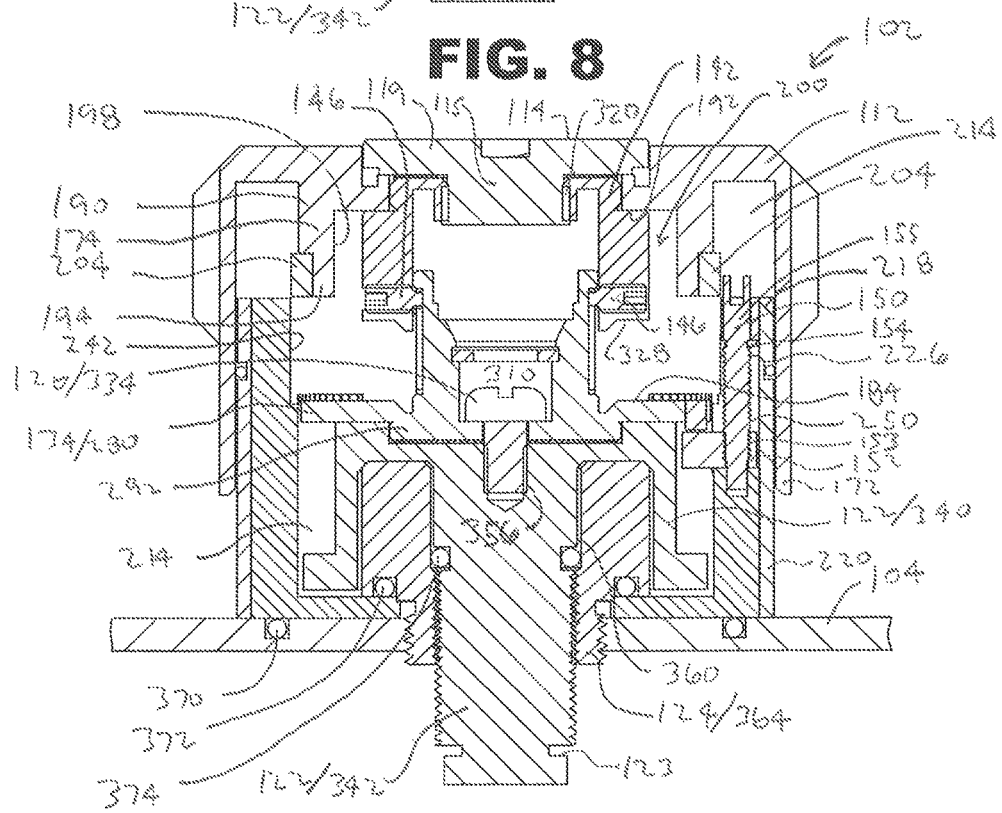
FIG. 9 is a sectional view of the turret assembly depicted in FIG. 7, in an unlocked position.

Referring also to FIGS. 8-9, depicting turret 102 in cross section, in a locked and an unlocked position, respectively, inner extension portion 174 extends from its proximal end 190 axially downward into cavity 186 from an inside, top surface 192 of upper portion 170 to its distal end 194. Inner extension portion 174 comprises a wall forming a generally cylindrical shape, and defines outer surface 196 and inner surface 198. Inner extension portion 174 and its inner surface 198 define inner cavity 200. As described further below, inner cavity 200 is sized and configured to receive a portion of upper portion 142 of zero-stop-set system 138.

Turret cover 112 may also include locking ring 204. In an embodiment, and as depicted, locking ring 204 is positioned at distal end 194 of inner extension portion 174. In the embodiment depicted, locking ring 204 comprises an annular ring. Locking ring 204 may have an outside diameter larger than an outside diameter of inner extension portion 174, and may fit over inner distal end 194 of inner extension portion 174, as depicted. In other embodiments, locking ring 204 may have an outside diameter substantially equal to an outside diameter of inner extension portion 174.

Locking ring 204, in an embodiment, includes a plurality of splines 206 distributed circumferentially about an outside surface of locking ring 204. Splines 206 extend axially along their lengths, and project radially away from Axis X into turret-housing-receiving cavity 186 and toward surface 188. Each pair of splines 206 defines a recess 208, such that locking ring 204 defines a plurality of splines 206 and recesses 208 circumferentially distributed about an exterior surface of locking ring 204. In alternative embodiments, splines 206 and recesses 208 may be replaced by other forms of keys and keyways that interact with complementary structures of turret housing 116, as described further below.

Although depicted as a separate structure fitted over, or onto, distal end 194 of inner extension portion 174, and affixed to, such as adhered to inner extension portion 174 via an adhesive or via mechanical means, locking ring 204, in alternative embodiments may be integral to inner extension portion 174, rather than comprising a separately manufactured and attached component.

Referring again to FIG. 4, turret housing 116, in an embodiment, forms a generally cylindrical shape and defines turret-housing cavity 214. As depicted, turret housing 116 includes scope-body end 216, turret-cover end 218, outer portion 220, inner portion 222 and turret alignment mark 223.

Scope-body end 216 is configured to be proximal scope body 104 when assembled onto scope 100; turret-cover end 218 is configured to be distal a scope body 104, and proximal upper portion 170 of turret cover 112. In an embodiment, rather than having separate inner and outer portions 220 and 228, turret housing 116 may comprise a combined or integral structure.

In an embodiment, and as depicted, outer portion 220 forms a cylindrical wall having an outside surface 224 defining circumferential o-ring channel 226 (see also FIGS. 8 and 9). O-ring 228 is received into channel 226. Outer portion 220 surrounds, is adjacent to, and in some embodiments, affixed to inner portion 222.

In an embodiment, alignment mark 223 comprises a linear channel or projection formed in or on a surface of turret housing 116, such as on an upper surface of inner portion 222. As will be understood by one of ordinary skill, alignment mark 306 make take other forms configured to provide a visual indication of the portion of disk portion 280 that is intended to be aligned, as described further below. Some embodiments may include an etched, scored, stamped, painted, colored, raised or other such alignment mark.

Figure 7:
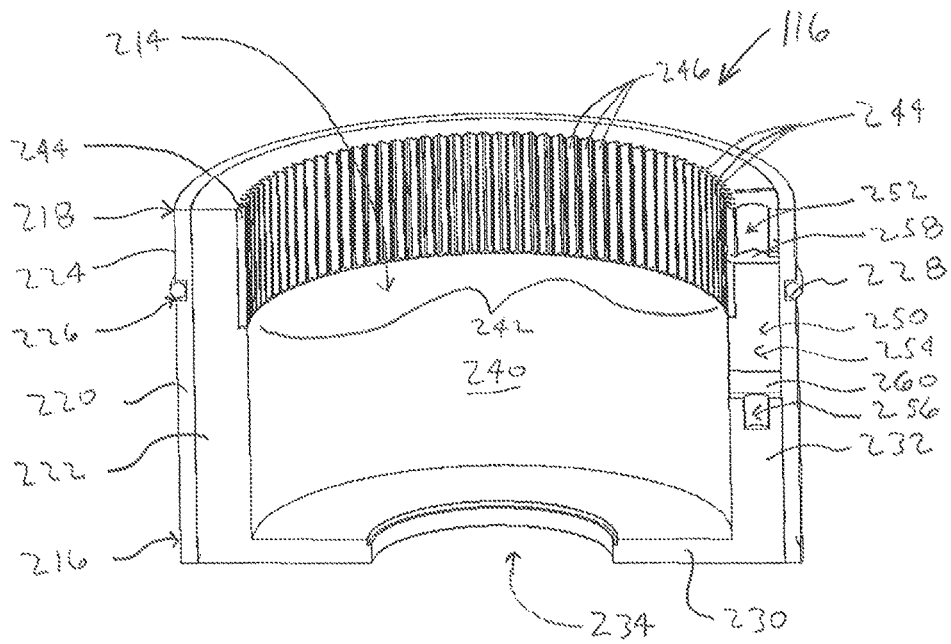
FIG. 7 is a sectional view of an embodiment of a turret housing of the turret assembly of FIG. 2.

Referring to FIGS. 4, 7 and 8, in an embodiment, inner portion 222 of turret housing 116 comprises first or base portion 230 and second or wall portion 232. Wall portion 232 may be integral to, as depicted, base portion 230, and may extend axially upward and away from base portion 230. Base portion 230 may resemble an annular ring or disk lying in a plane perpendicular to Axis X, and defining screw hole 234.

Wall portion 232, in an embodiment, forms inside surface 240, which defines turret-housing cavity 214. At an end distal to base portion 230, or at turret-cover end 218, inside curved surface 240 includes locking-ring receiving portion 242 (or "splined portion 242") comprising a plurality of splines 244 distributed circumferentially about an upper/turret-cover end of surface 240. In an embodiment, and as depicted, splined portion 242 of turret housing 116 extends axially only over a portion of an axial height of turret housing 116 and its inner wall portion 222. In other embodiments, splined portion 242 extends axially such that it forms more than 50% of a surface area of surface 240. In other embodiments, splined portion 242 extends less than half the axial height of inner wall portion 222. Alternative embodiments defining other relational sizes of splined portion 242 to surface 240 may be possible, and may be determined, at least in part by the characteristics of locking ring 204 and/or a travel distance of locking ring 204.

Each spline 244 extends axially along its length, and extends radially inward along its "height". A plurality of recesses 246 are formed between each pair of adjacent splines 244. As described further below, splines 244 and recesses 246 are configured to engage recesses 208 and splines 206 of locking ring 204.

Turret housing 116, and its inner wall portion 222 also defines a hollow portion or cavity, zero-stop-set system cavity 250, for receiving all or portions of zero-stop-set system 138. Cavity 250 extends generally axially within inner wall portion 222, with openings into turret housing cavity 214 and towards an inner surface of outer wall portion 220 of turret housing 116.

Cavity 250, in an embodiment, may be defined by multiple sub-cavities, including first or top screw-end cavity 252, stop channel 254, and second or bottom screw-end cavity 256. In an embodiment, and as depicted, inner wall portion 222 includes first or clip shelf 258 located at a junction of first screw-end cavity 252 and second-stop-element channel 254. Inner wall portion 222 may also include a second shelf, or second-stop-element limiting shelf 260. As described below, an end of adjustable set screw 150 resides in cavity 252, while another end of adjustable set screw 150 is received into cavity 256, while second stop element 152 is received into channel 254.

In an embodiment, and as depicted, cavity 252 defines a through hole, channel 254 defines a through hole, and cavity 256 defines a blind hole.

In addition to the openings at a top and bottom of channel 254 opening into cavities 252 and 256, respectively, channel 254 opens into turret-housing cavity 214 so as to allow second-stop element 152 to project into cavity 214. Channel 254 may also be open at a radially outside portion of inner wall portion 222, but bounded by outer wall portion 220.

Referring to FIGS. 4, 8-9 and 11, zero-stop system 118 is depicted. As described above, in an embodiment, zero-stop system 118 includes zero-stop-element carrier 134 ("carrier" 134), first stop element 136, and adjustable zero-stop set system 138. In an embodiment, carrier 134 includes base portion 140 and upper portion 142 slidably (in a slidable or movable manner) secured to base portion 140 with a plurality of fasteners 146.

In an embodiment, base portion 140 of carrier 134 comprises first or disk portion 280 coupled to second or cylindrical portion 282. In an embodiment, disk portion 280 and cylindrical portion may comprise an integrated structure, or two separate components assembled together.

Figure 11:
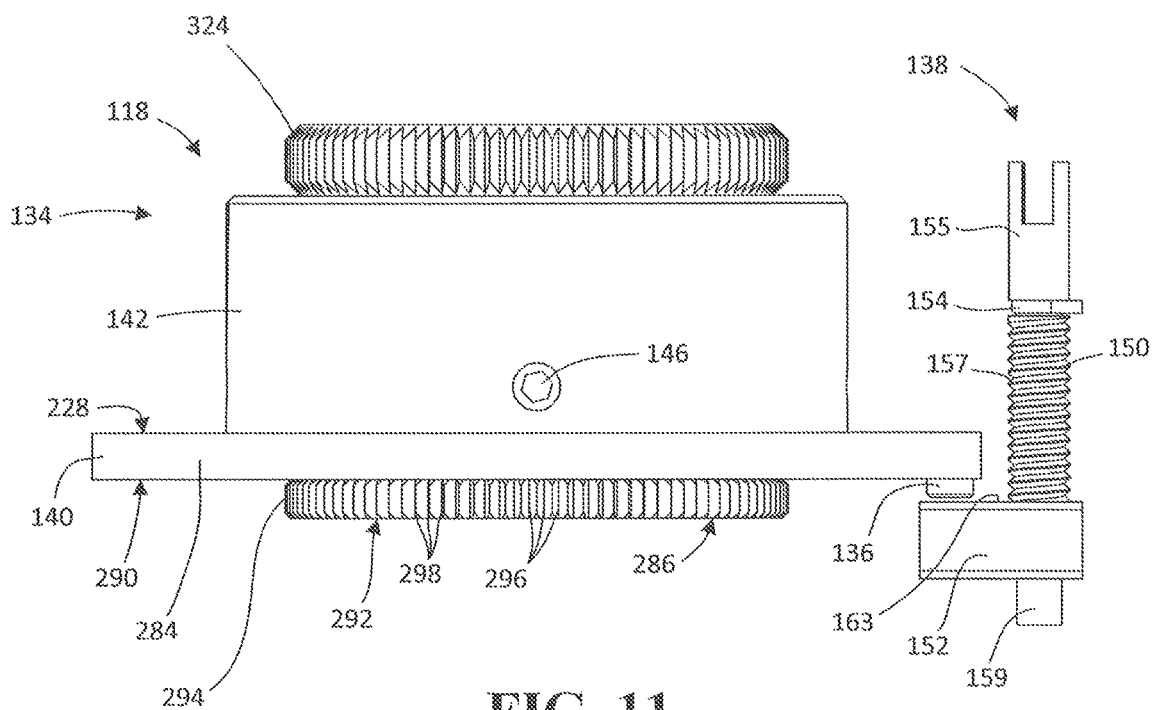
FIG. 11 is a front view of a zero-stop system in the position corresponding to FIG. 10, depicting a first stop element above a second stop element.

Disk portion 280 generally forms a disk or annular ring, and is comprised of a first disk portion 284 and a second disk portion 286 (see, FIG. 11). First disk portion 284 defines generally planar top surface 288 and bottom surface 290. Second disk portion 286 projects axially downward from bottom surface 290 and defines a generally planar bottom surface 292. Second disk portion 286 also defines circumferential surface 294 that includes a plurality of splines 296 and defines a plurality of recesses 298 distributed circumferentially about surface 294. Splines 296 extend axially downward and away from first disk portion 286 along their respective lengths, and project radially outward and away from central Axis X. As described further below and depicted in FIGS. 8 and 9, splined second disk portion 286 is configured to engage splined portion 242 and splines 244 of turret housing 116, when turret 102 is in a locked position.

Disk portion 280 defines a centrally-located hole 300, which receives carrier-release element 120 (see, FIGS. 8 and 9).

Disk portion 280 also defines first-stop-element-receiving hole 302 configured to receive first stop element 136. In an embodiment, hole 302 is located adjacent a perimeter portion of disk portion 280, or adjacent edge 304 of disk portion 280. First-stop-element-receiving hole 302 may define a through hole as depicted, or a blind hole. If first stop element 136 comprises a threaded screw, perimeter hole 302 may include complementary threads; if first stop element 136 comprises a pin, hole 302 may not be threaded, but rather, may define a smooth surface for engaging element 136 via a mechanical fit, such as a press or friction fit.

Top surface 288 includes visual indicator or alignment mark 306. In an embodiment, indicator or alignment mark 306 comprises a visual indicator that extends radially from second portion 282 towards circumferential edge 304 and perimeter hole 302. In an embodiment, alignment mark 306 comprises a linear channel or projection formed in surface 284. As will be understood by one of ordinary skill, alignment mark 306 make take other forms configured to provide a visual indication of the portion of disk portion 280 that is intended to be aligned, as described further below. Some embodiments may include an etched, scored, stamped, painted, colored, raised or other such alignment mark.

Cylindrical portion 282 extends axially upward and away from disk portion 280, and defines hole 310. Hole 310 is configured to receive carrier-release element 120. An inner surface defining hole 310 may also define a channel for receiving and securing carrier-release-element limiting clip 121.

Cylindrical portion 282 defines outer surface 312 and a plurality of slide channels 314. In an embodiment, slide channels 314 are distributed equidistantly about outer surface 312 of cylindrical portion 282. In the embodiment depicted, cylindrical portion 282 defines four slide channels 312, though in other embodiments, cylindrical portion 282 defines more or fewer than four slide channels 314. In an embodiment, cylindrical portion defines two slide channels 314. In an embodiment, cylindrical portion defines three to six slide channels 314.

In an embodiment, and as depicted, each slide channel extends axially along its length, and radially inward along its depth or height. As explained further below, slide channels 314 are configured to receive portions or tips of slide fasteners 146.

Upper portion 142 of carrier 134 generally comprises a cap or cover that fits over cylindrical portion 282 of base portion 140, and is slidably connected to base portion 140. Upper portion 142, in an embodiment, defines opening 320 and comprises body portion 322 and top, splined portion 324. In an embodiment, top splined portion 324 forms a disk shape having an outer diameter that is less than an outer diameter of body portion 322. As depicted, top spline portion 324 includes a plurality of splines 326 circumferentially distributed about an outer edge of top, splined portion 324. Top, splined portion 324 is configured to be received by turret cover 112, and to engage splined portion 180 of turret cover 112. Opening 320 is configured to receive a shaft portion 115 of turret-cover screw 114, allowing turret-cover screw 114 to be threaded into cylindrical portion 282 of base portion 140.

Body portion 322 includes bottom surface 328 and defines a plurality of holes 330 extending through body portion 322 and configured to receive slide pins 146. In an embodiment, the number of holes 330 matches the number of slide pins 146 and slide channels 314. In an embodiment, slide pins 146 include a threaded portion that engages corresponding threads of body portion 322 defining holes 330.

Holes 330 may be located near an axially lower portion of body portion 322 as depicted, but in other embodiments, may be located elsewhere. Each hole 330 is aligned with a corresponding slide channel 314 when upper portion 142 is assembled to base portion 140, such that a portion of each slide pin 146 is received by a hole 330 and a portion received by a channel 314, as described further below and as depicted in FIGS. 8 and 9.

Zero-stop-set system 138, in an embodiment, includes adjustable set screw 150, second stop element 152, and in some embodiments, set-screw retainer 154.

In an embodiment, adjustable set screw 50 includes first or top portion 155, threaded portion 157 and second end or bottom portion 159. First or top portion 155 comprises the head of adjustable set screw 150 and may be configured to receive an adjusting device, such as an end of a screwdriver, for rotating screw 150. In other embodiments, first portion 155 may comprise other structure for receiving an adjusting tool. In the embodiment depicted, first portion 155 projects out of and above turret housing 116 so as to be accessible to a user when turret cover 112 is removed (see, FIGS. 8 and 9). Second or bottom portion 159 of screw 150 may be non-threaded as depicted, or non-threaded. Second portion 159 may have a flat bottom and be configured to be received in blind hole 256 (see also, FIG. 7), so as to rotatably secure bottom portion 159 in turret housing 116, thereby preventing radial movement of screw 150.

Second stop element 152 defines threaded hole 153 configured to receive threaded portion 157 of adjustable set screw 150, such that second stop element 152 may travel axially along threaded portion 157 of screw 150 when screw 150 is rotated in place.

In the embodiment depicted, second stop element 152 generally comprises a block with rectangular sides. However, in alternative embodiments, second stop element 152 may comprise other shapes that allow second stop element 152 to connect to screw 150, project into turret-housing 214, and travel axially up and down within channel 254 and/or cavity 214. In an embodiment, second stop element 152 includes top portion 163, side portion 156 and side portion 161.

Set-screw retainer or clip 154 may comprise any variety of clips configured to engage adjustable set screw 150. In an embodiment, and as depicted, clip 154 engages adjustable set screw 150 at a location on screw 150 that is between top portion 155 and threaded portion 157, such that clip 154 is received into a channel of screw 150. As further depicted in FIGS. 8 and 9, a portion of clip 154 is also received by turret housing 116, securing clip 154 to turret housing 116, and thereby securing top portion 155 of screw 150 to turret housing 116, while allowing rotational movement of adjustable set screw 150.

While the various components of zero-stop system 118 allow a user to set a zero stop (as described below), the components of zero-stop system 118 also interact with other turret components to provide the locking function. In this respect, and as described further below, base portion 140 of carrier 134 slidably coupled to upper portion 142 of carrier 134 provides a linking function between turret housing 116 and turret cover 112, as well as a travel ranging and limiting function for turret cover 112. As such, carrier 134, and in particular base portion 140 and 142 may be considered an intermediate locking or linking structure with respect to a locking turret 102 of the invention.

Carrier-release element 120 in an embodiment comprises a fastener, such as a threaded screw having head 332 and threaded shaft 334.

Main screw 122, which may also be referred to as a turret screw, comprises head portion 340 and threaded shaft portion 342. Threaded shaft portion 342 extends axially downward and away from head portion 340, and in an embodiment, defines an outside diameter that is less than an outside diameter of head portion 340. As will be understood by one of ordinary skill, when assembled in scope 100, axial movement of main or turret screw 122 causes an erector assembly of scope 100 to move, thereby accomplishing an aiming function of scope 100.

Head portion 340, in an embodiment includes body portion 344 and flange portion 346. Body portion 344 includes first or lower portion 348 and second or upper portion 350. Flange portion 346 extends circumferentially about a lower portion of body portion 344, and in an embodiment, defines clicker hole 358, which extends from an outside portion of flange 346 and opens into an interior space defined by head portion 340. Upper portion 350 of body portion 344 defines recess 352 and splined wall portion 354. Recess 352 is configured to receive splined portion 292 of carrier 134, such that splined wall portion 354 engages splined portion 292 of carrier 134.

Head portion 340 also defines threaded hole 356 configured to receive threaded shaft 334 of carrier-release element 120.

Base screw 124 defines through hole 360 and includes head portion 362 and shaft portion 364. Shaft portion 364 is threaded into, and received by, scope body 104. Head portion 362, in an embodiment, may define splined outer surface or portion 366, including a plurality of axially-extending splines 368. Splined portion of head portion 362 is configured to be inserted into, or received by, head portion 340 of main screw 122. However, splined portion 362 does not engage with corresponding splines inside main screw 122, but rather, splines 368 engage with ball 160, as part of a tactile and audible position indicator or clicker system 126. Consequently main screw 122 may be rotated independently of, and within, base screw 124.

Audible position indicator ("clicker") system 126 includes ball 160 and ball retainer 162. When assembled, ball 160 is inserted into hole 358, and held in place by ball retainer 162. Ball 160 extends partially outside of hole 358, contacting splines 368 of base screw 368. Ball retainer 162 may also be biased against ball 160 through the use of a spring (not depicted) located between depicted ball retainer 162 and ball 160. As understood by those of ordinary skill, rotation of main screw 122, which carries ball 160 biased against splines 368 of main screw 124, causes an audible sound and vibration as ball 160 engages splines 368 as the splines Referring specifically to FIGS. 8 and 9, turret 102, fully assembled, is depicted in a locked position and unlocked position, respectively. The locked and unlocked positions will be explained further below, and after the following description meant to further elaborate on the engagement of the various above-described components in turret 102.

Turret-housing cavity 214 receives base screw 124 and main screw 122. Turret housing 116 is coupled to scope body 104 by base screw 124. Shaft portion 364 of base screw 124 is threaded into an opening of scope body 104. Head portion 362 of base screw 124 engages base portion 230 of turret housing 115, thereby securing turret housing 116 onto scope body 104. As depicted, o-ring 370 form a seal between scope body 104, and o-ring 372 forms a seal between main screw 124 and turret housing 116.

Shaft portion 342 of main screw 122 is threadably inserted into hole 360 of base screw 124. O-ring 374 forms a seal between main screw 122 and base screw 124. Base screw 124 remains stationary and secured to scope base 104, while main screw 122 may be rotated and thereby moved axially, as described further below.

Zero-stop-element carrier 134 is coupled to head portion 340 of main screw 122. Threaded shaft 334 of carrier release element or screw 120 is received through hole 300 of disk portion 280 and threaded into hole 356 of main screw 122. Head 334 of screw 120 is received into bore 310 and engages base portion 140, thereby axially coupling base portion 140 of carrier 134 to main screw 122. Further, splined portion 292 of carrier 134 is received into recess 352, such that spline portion 292 engages splined wall portion 354 of main screw 122. In this position, rotation of base portion 140 would cause rotation of main screw 122.

Carrier-release-element limiting clip 121 is coupled to base portion 140 in hole 310, thereby limiting axial displacement of screw 120.

Upper portion 142 of carrier 134 is slidably coupled to base portion 140. Slide pins 146 are received into holes 330, with an end portion of each slide pin 146 being received into a channel 314 of upper portion 142. Upper portion 142 is configured to move axially up and down relative to base portion 140. Engagement of slide pins 146 in slide channels 314 prevents rotation about Axis x and radial displacement of upper portion 142, however, upper portion 142 may be moved axially, with pins 146 sliding up and down channels 314. Axial travel of upper portion 142 is limited in one direction, a downward direction, by base portion 140, which is coupled to main screw 122 during operation. Axial travel of upper portion 142 in an upward direction away from base portion 140 is limited by the engagement of slide fasteners 146 with base portion 140 at termination ends 315 of slide channels 314. Termination channels 315 are adjacent end 283, which is at a "top" end, or end distal disk portion 280 of base portion 140.

FIG. 8 depicts turret 102 in a locked position, whereby upper portion 142 of carrier 134 is located in a downward-most position such that bottom surface 328 of upper portion 140 is adjacent top surface 184 (see also, FIG. 9 for surfaces 328 and 184).

FIG. 9 depicts turret 102 in an unlocked position, whereby upper portion 142 of carrier 134 is located in an upward-most position such that bottom surface 328 of upper portion 140 is separated from top surface 184.

Referring again to both FIGS. 8 and 9, a portion of first stop element 136 is received into hole 302 of carrier 134, and a portion of first stop element 136 projects axially downward and away from first stop element 136.

Adjustable set screw 150 is received in cavity 250 of turret housing 116, with a top portion 155 of adjustable set screw 150 partially within top cavity 254 and partially projecting above turret-cover end 218 of turret housing 116.

Set screw retainer or clip 154 is affixed to adjustable set screw 150 and secured to turret housing 116, thereby securing adjustable set screw 150 to turret housing 116. As described further below, in operation, adjustable set screw 150 is rotatable, but does not move axially during rotation as it is held in place by clip 154.

Second stop element 152 is coupled to adjustable set screw 150, and received in part within channel 254, and received in part within turret-housing cavity 314. As depicted, first stop element 136 is positioned directly above second stop element 152 (a pre-adjustment position). The operation of zero-stop-set system 138 will be described further below.

Threaded shaft 115 of turret screw 114 is received into opening 320 and threaded into upper portion 142 of carrier 134; head portion 119 of turret screw 114 engages annular surface 117 of turret cover 112. Consequently, turret screw 114 connects turret cover 112 to upper portion 142 of carrier 134.

Referring specifically to FIG. 8 depicting turret 102 in a first, or locked position, turret cover 112 has been pressed axially downward such that locking disk 204 is engaged with splined portion 242. Upper portion 142 of carrier 134 is in a down position, and engaged with base portion 140, as described above. In this position, turret cover 112 may not be rotated because locking ring 204 is engaged with turret housing 116, which is stationary. Consequently, carrier 134 and main screw 122 also may not be rotated.

Referring specifically to FIG. 9 depicting turret 102 in a second or unlocked position, turret cover 112 has been axially raised upwardly such that locking ring 204 is no longer engaged with splined portion 194 of turret housing 116. Upper portion 142 of carrier 134 is also in a raised position, but still engaged to base portion 140. In this unlocked position, turret cover 112 may be rotated, which in turn, rotates upper and lower portions of carrier 134, and hence main screw 122.

The components and structures of turret 102 as described above combine to offer a user both a turret locking feature and an adjustable zero-stop feature. Although components and structure that enable the locking feature and the adjustable zero-stop feature may not be mutually exclusive, the operation of the locking feature will first be described below, followed by a description of the adjustable zero-stop feature.

Referring to FIG. 8, as indicated above, turret 102 is depicted in the locked position. In this position, turret cover 112 is in a position closest to scope body 104. Splines of locking ring 204 are engaged with splined portion 242 of turret housing 116. In this locked position, a user may not rotate turret cover 112, and therefore, may not cause main screw 122 to be rotated. Consequently, in this first or locked position, unless turret cover 112 is moved axially such that locking ring 204 clears splined portion 242, or lies in a horizontal plane above a horizontal plane of a top portion of locking ring 204, an accidental force applied to turret cover 112 or turret 102 will not result in movement of main screw 122, such that scope 100 remains sighted.

Conversely, in the unlocked position depicted in FIG. 9, turret cover 112 has been moved axially to an uppermost position. As such, locking ring 204 is positioned such that it is not engaged with turret housing 116 and its splined portion 242, and will rotate when a user rotates turret cover 112. More specifically, a lowermost portion of locking ring 204 is above an uppermost portion of splined portion 242 of turret housing 116.

Turret cover 112 is linked to main screw 122 through carrier 134, and the axial travel of turret cover 112 is limited by the axial travel of upper portion 142 to base portion 140 of carrier 134. As described above, turret cover 112 is coupled to upper portion 142, which is slidably coupled to base portion 140, and base portion 140 is coupled to main screw 122 via screw 120. Consequently, when turret cover 112 is lifted or moved axially upward, the range of motion is limited to approximately, or slightly less than, an axial length of a channel 314. In an embodiment, the range of axial travel of turret cover 112 (and axial travel of upper portion 142) is a maximum of the axial length of a channel 314 less average width of a tip of a slide fastener 146 that is engaged in slide channel 314.

Due to the dual functionality of carrier 134 and its components, carrier 134 herein may also be referred to as an intermediate structure, linking structure, intermediate linking structure, or similarly-named structure, having first and second portions corresponding to upper portion 142 and lower portion 140 (or vice versa).

As such, a method of using or aiming scope 100 may include the steps of: applying an axially upward force to turret cover 112 causing turret cover 112 to move axially upward and causing locking ring 204 to disengage with splined portion 242 of turret housing 116, while maintaining mechanical connection to main screw 122 via an intermediate or connecting structure having a stationary portion and a moving portion, such as carrier 134; causing carrier 134 to move to a first position, such as a first portion of carrier 134 being separated from a second portion of carrier 134, while retaining a mechanical connection between carrier 134 and main screw 122; applying a rotational force to turret cover 112 with locking ring 204 disengaged from splined portion 242, thereby causing turret cover 112 and carrier 134 to rotate, causing main screw 122 to rotate; and applying an axially downward force to turret cover 112, causing carrier 134 to move to a second position and locking ring 204 to engage with splined portion 242 of turret housing 116, thereby preventing rotation of turret 102 and main screw 122.

In an unlocked position, a user may rotate turret 102 to sight scope 100 in for various distances, moving turret cover 112 back and forth between a locked and unlocked position as needed. In an embodiment, such locking and unlocking may generally be accomplished without consideration to a zero-stop setting. In fact, FIGS. 8 and 9 depict turret 102 in a configuration where first stop element 136 will not engage second stop element 152, such as prior to adjusting a zero-stop setting. In such a configuration, turret cover 112 and main screw 122 may be rotated, and move "upward" until a retaining clip (not shown) in channel 123 on an end of main screw 122 abuts base screw 124, thereby limiting upward axial movement of main screw 122. Downward axial movement of main screw 122 is limited by head portion 340 of main screw 122 abutting base portion 230 of turret housing 116. Consequently, turret 102 may be used, including use of the locking feature described, without initializing or setting adjustable zero-stop system 118, if a user prefers.

However, practically speaking, a user will generally want to set a zero-stop for turret 102 and scope 104 so that turret 102 may be quickly and conveniently rotated back to the zero position. As will be described further below with respect to FIGS. 10-15, when a zero-stop of turret 102 is set, rotation of turret 102 may be limited to less than 360 degrees, or in other embodiments may not be limited to less than 360 degrees, but may still have a rotational limit or stop in one rotational direction.

Figure 10:
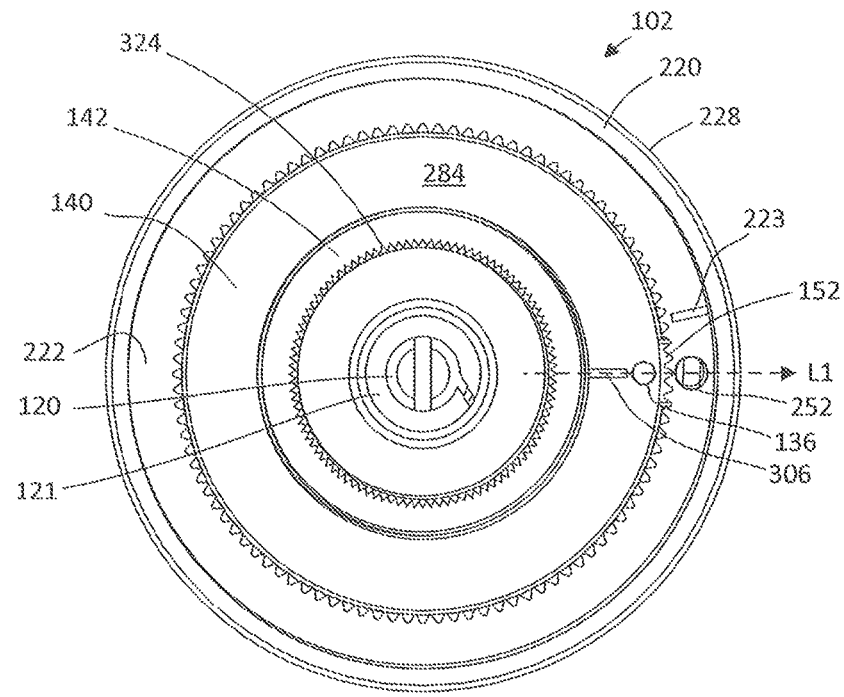
FIG. 10 is a plan view of the turret assembly of FIG. 2, with a turret cover removed, prior to adjustment of a zero-stop system, and with a first stop element located above a second stop element.

Referring to FIGS. 10 and 11, adjustable zero-stop-set system 118 is disengaged, or positioned such that first stop element 136 cannot engage second stop element 152. This position corresponds to FIGS. 8 and 9.

Figure 14:
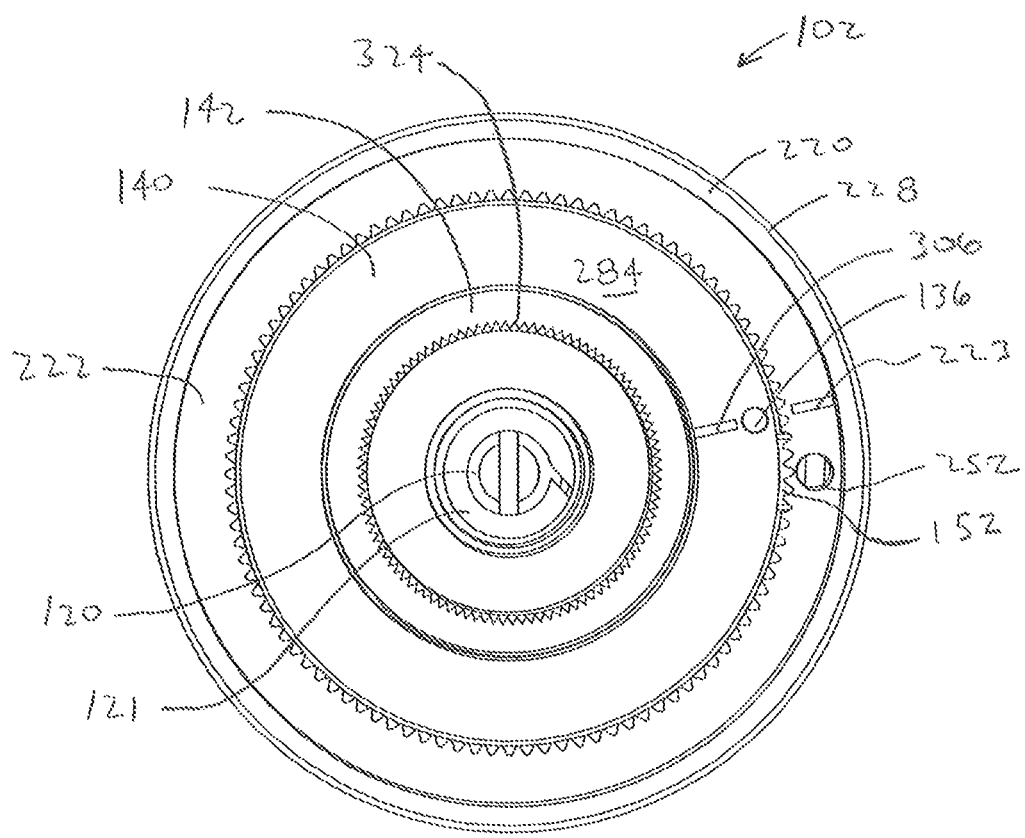
FIG. 14 is a plan view of the turret assembly of FIG. 2, with a turret cover removed, after adjustment of a zero-stop system, and with a first stop element adjacent a second stop element.

Referring to FIG. 10, which is a plan view of turret 102 with turret cover 112 removed, alignment mark 306 of stop-element carrier 134 is not aligned with alignment mark 223 of turret housing 116. In the context of this description, "aligned" is intended to mean generally arranged in a linear manner, which may include arrangement of components in a common plane or in different planes (see, e.g., FIG. 14 depicting an aligned position). First stop element 136, which is fixed in a position adjacent alignment mark 306, and which may serve as an additional visual alignment indicator, is aligned with second stop element 152 and adjustable set screw 150 along Line L1.

Referring to FIG. 11, first stop element 136, affixed to stop-element carrier 134, projects downward from stop-element carrier 134 toward second stop element 152. In the depicted position, first stop element 136 does not contact second stop element 152. Stop element 152 is positioned axially on threaded portion 157 near bottom portion 159 of adjustable set screw 150.

Figure 12:
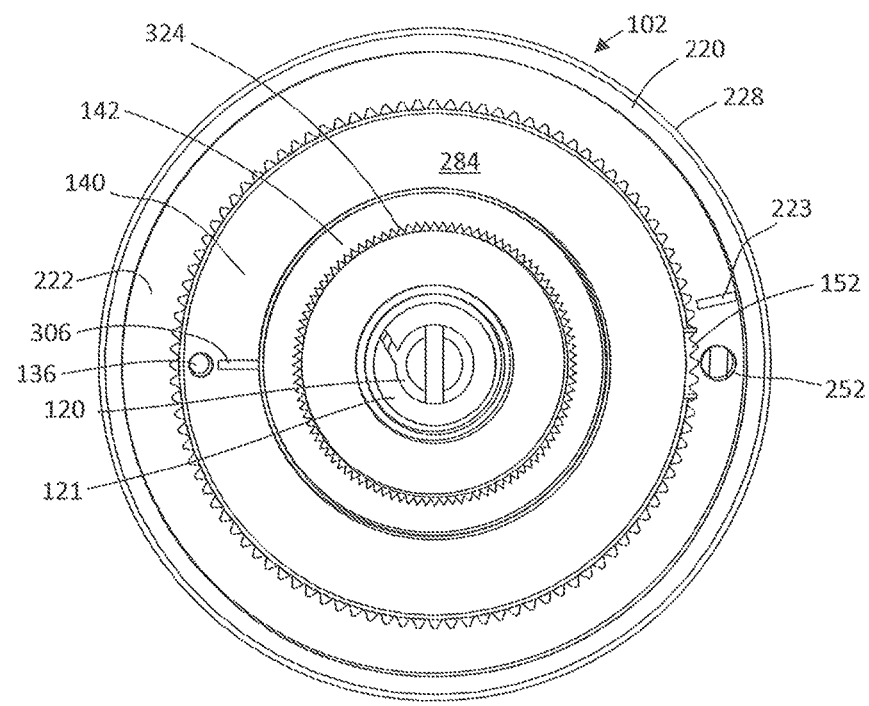
FIG. 12 is a plan view of the turret assembly of FIG. 2, with a turret cover removed, prior to adjustment of a zero-stop system, and with a first stop element rotated away from a second stop element following setting of a zero point.
Figure 13:
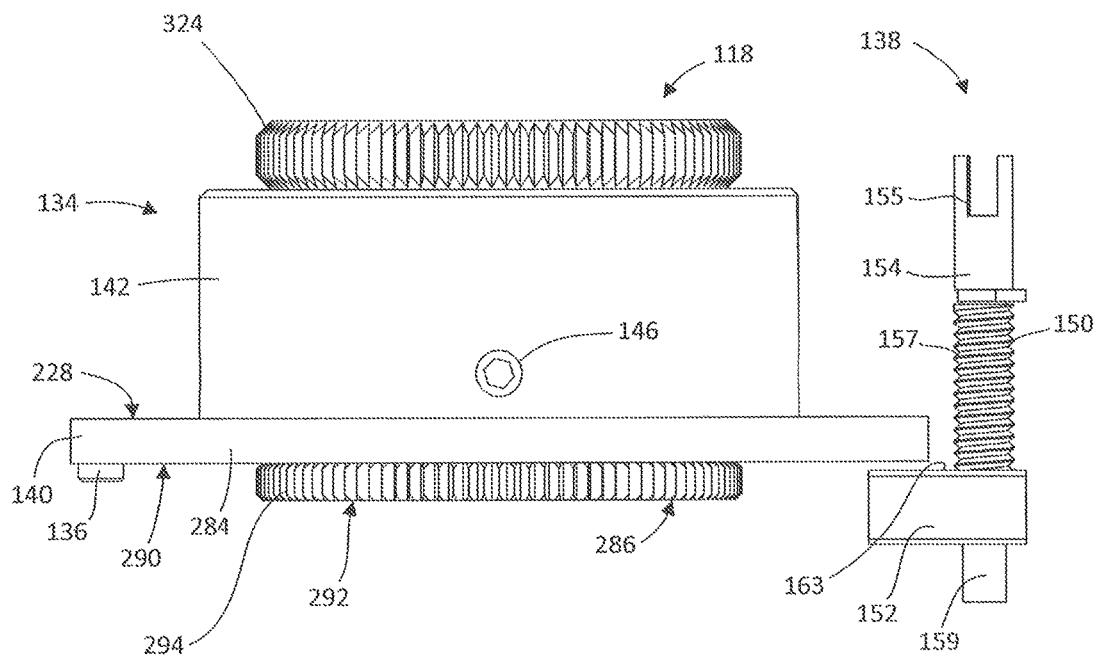
FIG. 13 is a front view of a zero-stop system in the position corresponding to FIG. 12.

Referring to FIGS. 12 and 13, stop-element carrier 134 has been rotated approximately 180 degrees as compared to the position depicted in FIGS. 10 and 11. Rotation of stop-element 134 may be caused by a user rotating turret cover 112 and main screw 122 as part of a process of sighting in or zeroing rifle scope 100 for a zero distance. Consequently, the relative position of carrier 134 to adjustable zero-stop-set system 138 represents a position in which rifle scope 100 is zeroed, i.e., main screw 122 has been rotated to a desired axial position such that a projectile would be expected to strike a target at the predetermined zero distance, e.g., 100 yards.

As depicted, alignment mark 223 is not yet aligned with alignment mark 306, and first stop element 136 is not yet in contact with second stop element 152. Stop element 152 has been axially repositioned, or raised, via rotation of screw 150, a step in a process of setting a zero stop, as will be described further below.

In the position depicted in FIGS. 12 and 13, even though rifle scope 100 may be sighted in to the desired zero distance, a zero stop is not yet set. However, turret screw 122 (not depicted) is in the desired axial position for the zero distance. Consequently, if turret cover 112 were rotated, turret screw 122 would be rotated, and scope 100 would no longer be sighted in at the zero distance. As described further below, setting the zero stop via adjustment of zero-stop system 118 after sighting scope 100 to the zero distance prevents turret 102 and main screw 122 from being rotated in one direction via engagement of first and second stop elements 136 and 152 (though turret 102 may be rotated in the other direction to aim at distances greater than the zero distance). Therefore, to set the zero stop, the position of carrier 134 and first stop element 136 relative to second stop element 152 needs to be changed without rotating main screw 122.

Figure 15:
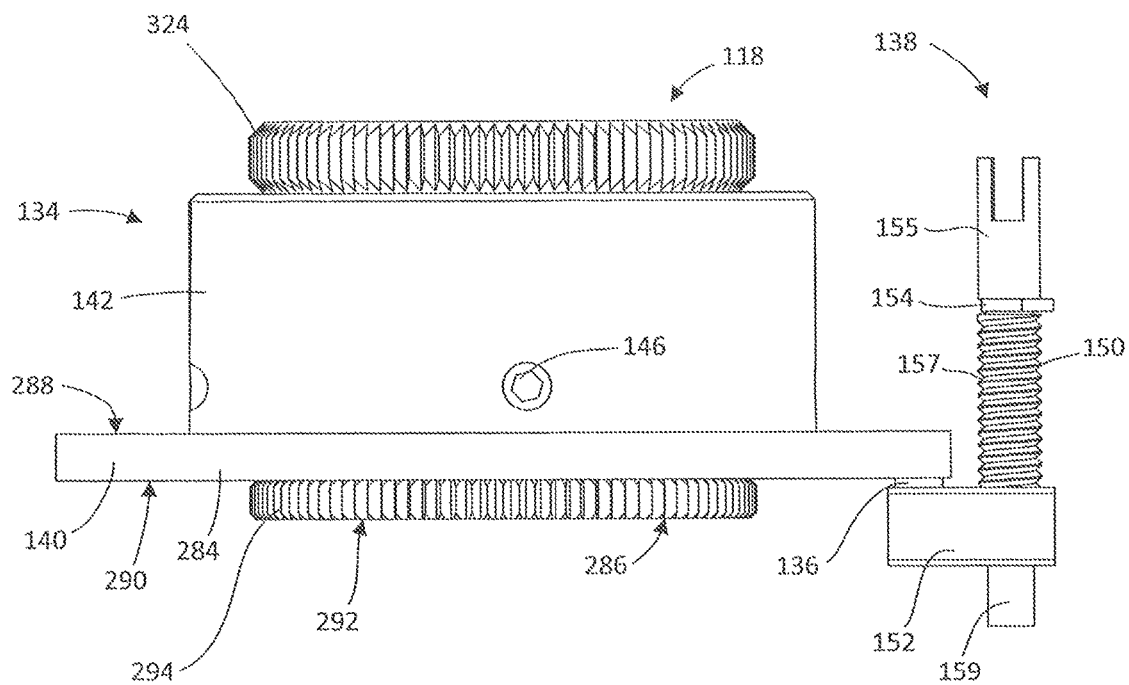
FIG. 15 is a front view of a zero-stop system in the position corresponding to FIG. 14.
Figure 16:
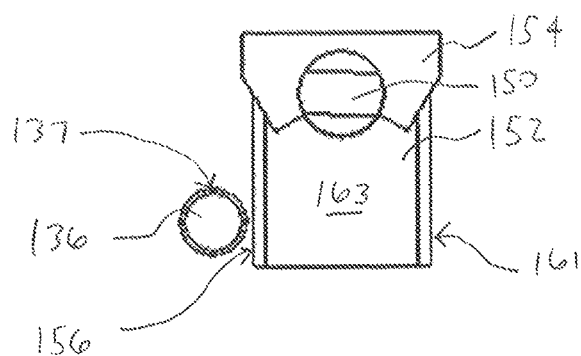
FIG. 16 is a plan view of a first stop element positioned adjacent a second stop element after adjustment of a zero-stop system.

FIGS. 14-16 depict turret 102 wherein a zero stop has been set. Carrier 134 has been repositioned such that alignment mark 306 is aligned or positioned adjacent alignment mark 223. Further, adjustable set screw 150 has been rotated to cause second stop element 252 to move axially upward so that at least a portion of first zero-stop element 136 and at least a portion of second zero-stop element 152 lie in a common plane, the common plane being transverse or being perpendicular to central vertical Axis X. Consequently, first stop element 136 is adjacent to, and abutting, second stop element 152. More specifically, and referring to FIG. 16, outer cylindrical surface 137 of first stop element 136 is contacting a side of second stop element 152 at side surface 156. In this aligned position, stop-element carrier 134 cannot be rotated in a clockwise direction, hence main screw 122 also may not be rotated in a clockwise direction. Consequently, the zero stop for turret 102 is "set", and scope 100 is zeroed at the zero distance.

After setting the zero stop as depicted in FIGS. 14-16, turret 102 (and carrier 134 and main screw 122) may be rotated in a counter-clockwise direction, thereby rotating main screw 122 in a counter-clockwise direction. Such rotation allows scope 100 to be aimed at distances greater than the zero stop distance corresponding to the position of FIGS. 14-16.

Rotation in the counter-clockwise position may be limited by zero-set adjustment system 118. In an embodiment, when carrier 134 is rotated in a counter-clockwise direction off of the zero set position as depicted in FIGS. 14-16, first stop element 136 may strike or engage second stop element 152 at side surface 161. In such an embodiment, rotation of carrier 134, turret cover 112 and turret 102 is limited to just under 360 degrees. When rotation is limited in a counter-clockwise direction due to engagement of the stop elements, the exact degree of rotation available depends on a width of second stop element 152. For example, if stop element 152 were infinitesimally narrow, rotation would be limited to precisely 360 degrees.

In another embodiment, rotation is not limited in a counter-clockwise direction by stop elements 136 and 152. In such an embodiment, and as one of ordinary skill would understand, the length or distance that first stop element 136 projects from surface 290 of carrier 134 and a thread pitch and diameter of main screw 122 are such that rotation of main screw 122 in a counter-clockwise direction causes carrier 134 and first stop element 136 to move axially upwards such that when first stop element 136 rotates to a position from the zero stop setting back around to second stop element 152, first stop element 136 resides in a plane above a top surface of second stop element 152, such that first stop element 136 may pass over top surface 163 of second stop element 152, i.e., rotation is not limited by the stop elements in a counter-clockwise direction. As described above, counter-clockwise rotation of main screw 122 may ultimately be limited by a limiting clip attached to an end of main screw 122 at channel 123. Such a limitation caused by a limiting clip may allow greater than 360 degrees of rotation.

As described in part above, embodiments of the invention include a variety of methods of setting a zero stop of a turret 102 and scope 100, including the following:

Initially, and as described above with respect to FIGS. 10 and 11, turret 102 is depicted in a condition such that a zero stop has not yet been set. FIGS. 10 and 11 represent only one possible rotational position and alignment of carrier 134 within turret housing 116, and relative positions of stop elements 136 and 152, so it will be understood that other initial or starting positions and alignments may be possible, depending on previous use or settings.

In an embodiment of a method for setting a zero stop of a rifle scope 100 turret 102, in a first optional series of steps, a user removes turret screw cap 114 and turret cover 112. Then, the user rotates adjustable set screw 150 causing second stop element 152 to travel axially away from carrier 134. Second stop element 152 may travel to a point such that that no portion of second stop element 152 may engage first stop element 136 when carrier 134 is rotated. Turret cover 112 and turret screw cap 114 may optionally be reattached to turret 102.

Next, with turret cover 112 in an unlocked position (see, also, FIG. 9), the user sights in the firearm with scope 100 such that the projectile strikes that target at the zero distance, i.e., sights in the firearm to the zero distance. To do so, user grasps and rotates turret cover 112 to a desired rotational position and fires the firearm at the target distance corresponding to a zero distance. As described above, in an unlocked position, rotation of turret cover 112 causes rotation of main screw 122, which moves the position of an erector assembly and optics of scope 100. The user may then further adjust the rotational position of turret cover to sight or zero the firearm and scope 100 at the zero distance.

After rotation of turret 102, the position of first stop element 136 in relation to second stop element 152 could be nearly any position, but for the sake of example, such a position may be as depicted in FIGS. 12 and 13.

With the firearm now zeroed for the desired distance, a zero stop may be set as follows: turret cap 114 is removed from turret cover 112, thereby disengaging turret cover 112 from carrier 134; turret cover 112 is moved axially upward and removed from turret 102.

At this point, because splined portion 292 of carrier 134 (see, FIG. 11) is still within recess 352 of main screw 122 and engaged with splined wall portion 354 of main screw 122, any rotation of carrier 134 would cause main screw 122 to rotate, which would cause scope 100 to no longer be zeroed to the zero distance. Consequently, carrier 134 must be disengaged from main screw 122 in order to align first stop element 136 with second stop element 152 as depicted in FIGS. 14-16, so as to avoid rotating main screw 122.

Therefore, as a next step, carrier-release element (screw) 120 is rotated or loosened by the user using a screwdriver or other tool, causing screw 120 to move axially upward and away from main screw 122, while remaining engaged with main screw 122. This loosens the connection between carrier 134 and main screw 122. Axial movement of carrier-release element 120 is limited by clip 121 located above screw 120, so that a user may not mistakenly disengage carrier 134 from main screw 122 and turret 102. In an embodiment screw 120 may be rotated three full turns to allow sufficient axial movement of carrier 134 as described further below.

After screw 120 has been loosened, the user may then grasp carrier 134 at upper portion 142, and pull so as to apply an upward force on upper portion 142, causing upper portion 142 to slide axially upward, and then causing both upper portion 142 and base portion 140 to move axially upward and away from main screw 122. If the axial movement is sufficient, the axial translation of base portion 140 causes splined portion 292 to be removed completely from recess 352, thereby disengaging splined portion 292 from splined wall portion 354 and main screw 122.

The user then rotates carrier 134, while main screw 122 remains stationary, until alignment mark 306 of carrier 134 is aligned with alignment mark 223 of turret housing 116, as depicted in FIG. 14. This causes first stop element 136 to be in the relative circumferential position indicated in FIGS. 14 and 16.

The user then pushes carrier 134 axially downward toward main screw 122, thereby reengaging splined portion 192 with splined wall portion 354, and reengaging carrier 134 and main screw 122.

The user then rotates screw 120 causing it to move axially downward, thereby fastening carrier 134 to main screw 122.

Next, the user rotates adjustable set screw 150 in a first direction, causing first stop element 136 to travel axially upward along threaded shaft 157 through channel 254, until top portion 163 abuts bottom surface 290 of disk portion 280 of carrier 134. In an embodiment, a user then rotates set screw 150 in a second direction a small amount, such as a quarter turn, thereby moving second stop element downward and away from bottom surface 290 and creating a clearance or small gap between top portion 163 of second stop element 152 and surface 290. Completion of this step causes first stop element 136 and second stop element 152 to be located as depicted in FIGS. 14-16, thereby setting a zero stop for the particular zero distance.

To complete the process, a user may then replace turret cover 112 and turret screw 114 in either the locked position or unlocked position.

The above references in all sections of this application are herein incorporated by reference in their entireties for all purposes.

All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive.

Each feature disclosed in this specification (including references incorporated by reference, any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed The above references in all sections of this application are herein incorporated by references in their entirety for all purposes.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative aspects. The above described aspects embodiments of the invention are merely descriptive of its principles and are not to be considered limiting. Further modifications of the invention herein disclosed will occur to those skilled in the respective arts and all such modifications are deemed to be within the scope of the invention.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed:

1. A locking turret for an optical firearm scope, the turret defining a central vertical axis and comprising:
   a main screw rotatable about the central vertical axis;
   a turret cover configured to be grasped by a user, the turret cover including a locking ring;
   a turret housing including a locking-ring receiving portion configured to receive and engage the locking ring of the turret cover in a first, locked position, such that rotational movement of the turret cover is limited;
   a linking structure comprising a base portion coupled to the main screw and an upper portion coupled to the turret cover, the upper portion being slidably coupled to the base portion so as to allow limited axial travel of the upper portion relative the base portion and the main screw, and thereby limit axial travel of the turret cover and prevent disengagement of the turret cover from the turret housing,
   wherein the base portion of the linking structure defines a plurality of axial channels, and the upper portion is slidably coupled to the base portion by a plurality of slide fasteners, each of the plurality of slide fasteners having a portion projecting into one of the plurality of axial channels and a portion affixed to the upper portion such that both the plurality of slide fasteners and the upper portion are configured to travel axially together when the upper portion travels in an axial direction.

2. The locking turret of claim 1, wherein the locking-ring receiving portion of the turret housing includes a splined portion having a plurality of splines circumferentially distributed about an inner cylindrical surface, and the locking ring includes a plurality of splines distributed about an outer surface.

3. The locking turret of claim 2, wherein the turret cover comprises a cylindrical inner extension portion concentric with an outer portion of the turret cover, and the locking ring is attached to an end of the inner extension portion.

4. The locking turret of claim 1, wherein the axial travel of the upper portion is limited by the plurality of slide fasteners contacting portions of the base portion at axial ends of the plurality of channels.

5. The locking turret of claim 1, further comprising a turret cover screw, and wherein a head of the turret cover screw abuts a surface of the turret cover and a shaft of the turret screw is coupled to the upper portion of the linking structure, thereby connecting the turret cover to the linking structure.

6. The locking turret of claim 5, wherein the base portion of the linking structure is coupled to the main screw via a fastener aligned along the central vertical axis.

7. The locking turret of claim 1, wherein the turret cover is configured to move a distance axially to an unlocked position, wherein the distance is less than or substantially equal to a distance defined by the limited axial travel of the upper portion of the linking structure relative the base portion of the linking structure.

8. The locking turret of claim 1, wherein the linking structure includes a zero-stop mechanism for setting a zero stop.

9. The locking turret of claim 8, wherein the zero-step mechanism includes a first zero-stop element, a second zero-stop element and an adjustable set screw adjacent an opening of a wall portion of the turret housing, the adjustable set screw including a threaded shaft portion, the second zero-stop element receiving the threaded shaft portion, a first portion of the second zero-stop element positioned within the opening of the wall portion, and a second portion of the second zero-stop element projecting outside the opening of the wall portion and into a cavity of the turret housing; and wherein the second zero-stop element is configured to travel axially along the threaded shaft portion of the adjustable set screw from a first axial position to a second axial position, and wherein in the second axial position, portions of the first zero-stop element and the second zero-stop element reside in a common plane, the common plane being perpendicular to the central vertical axis.

10. An optical firearm scope with a locking turret, comprising:
   a scope body; and
   the locking turret coupled to the scope body, the locking turret defining a central vertical axis and including:
      a main screw rotatable about the central vertical axis and having a head portion and a shaft portion, the shaft portion extending into an interior of the scope body;
      a turret cover configured to be grasped by a user, the turret cover including a locking ring;
      a turret housing including a locking-ring receiving portion configured to receive and engage the locking ring of the turret cover in a first, locked position, such that rotational movement of the turret cover is limited;
      a linking structure comprising a base portion directly coupled to, and in contact with, the head portion of the main screw and an upper portion coupled to the turret cover, the upper portion being coupled to the base portion so as to allow limited axial travel of the upper portion relative the base portion and the main screw, and thereby limit axial travel of the turret cover and prevent disengagement of the turret cover from the turret housing
      wherein the linking structure includes a zero-stop mechanism for setting a zero stop, the zero-stop mechanism including a threaded adjustable set screw, a first zero-stop element, and a second zero-stop element, the threaded adjustable set screw engaged with the second zero-stop element such that adjustment of the threaded adjustable set screw causes the second zero-stop element to travel axially along the threaded adjustable set screw.

11. The scope of claim 10, wherein the threaded adjustable set screw is adjacent an opening of a wall portion of the turret housing, the threaded adjustable set screw including a threaded shaft portion, the second zero-stop element receiving the threaded shaft portion, a first portion of the second zero-stop element positioned within the opening of the wall portion, and a second portion of the second zero-stop element projecting outside the opening of the wall portion and into a cavity of the turret housing; and wherein the second zero-stop element is configured to travel axially along the shaft of the threaded adjustable set screw from a first axial position to a second axial position, and wherein in the second axial position, portions of the first zero-stop element and the second zero-stop element reside in a common plane, the common plane being perpendicular to the central axis.

12. An adjustable zero-stop turret assembly for an optical firearm scope, the turret assembly defining a central vertical axis and comprising:
   a turret housing defining a turret housing cavity and including a wall portion, the wall portion defining an opening;
   a zero-stop element carrier configured to rotate about the central vertical axis and including a base portion, an upper portion and a first zero-stop element, the first zero-stop element affixed to the base portion and rotatable with the base portion;
   an adjustable set screw adjacent the opening of the wall portion, the adjustable set screw including a threaded shaft portion;
   a second zero-stop element receiving the threaded shaft portion, a first portion of the second zero-stop element positioned within the opening of the wall portion, and a second portion of the second zero-stop element projecting outside the opening of the wall portion and into the turret housing cavity;
   wherein the second zero-stop element is configured to travel axially along the threaded shaft portion of the adjustable set screw from a first axial position to a second axial position, and wherein in the second axial position, portions of the first zero-stop element and the second zero-stop element reside in a common plane, the common plane being perpendicular to the central vertical axis.

13. The adjustable zero-stop turret assembly of claim 12, further comprising a main screw rotatable about the central vertical axis, the main screw including a head portion defining a recess, the recess configured to receive a portion of the base portion.

14. The adjustable zero-stop turret assembly of claim 13, further comprising a carrier-release fastener coupling the zero-stop element carrier to the head portion of the main screw.

15. The adjustable zero-stop turret assembly of claim 12, wherein the base portion of the zero-stop element carrier defines a plurality of axial channels, and the upper portion is slidably coupled to the base portion by a plurality of slide fasteners, each of the plurality of slide fasteners having a portion projecting into one of the plurality of axial channels.

16. The adjustable zero-stop turret assembly of claim 15, wherein axial travel of the upper portion is limited by the plurality of slide fasteners contacting portions of the base portion at axial ends of the plurality of channels.

17. The adjustable zero-stop turret assembly of claim 12, further comprising a turret cover coupled to the upper portion of the zero-stop element carrier and covering a portion of the turret housing.

18. The adjustable zero-stop turret assembly of claim 17, further comprising a turret cover screw, and wherein a head of the turret cover screw abuts a surface of the turret cover and a shaft of the turret screw is coupled to the upper portion of the zero-stop element carrier, thereby connecting the turret cover to the zero-stop element carrier.

* * * * *